US006812602B2

(12) United States Patent
York

(10) Patent No.: US 6,812,602 B2
(45) Date of Patent: Nov. 2, 2004

(54) APPARATUS AND METHOD FOR RETAINING A COOLING FAN

(75) Inventor: Michael T. York, Chelsea, MI (US)

(73) Assignee: Visteon Global Technologies, Inc., Dearborn, MI (US)

(*) Notice: Subject to any disclaimer, the term of this patent is extended or adjusted under 35 U.S.C. 154(b) by 0 days.

(21) Appl. No.: 10/635,179

(22) Filed: Aug. 6, 2003

(65) Prior Publication Data
US 2004/0178697 A1 Sep. 16, 2004

Related U.S. Application Data
(60) Provisional application No. 60/454,279, filed on Mar. 13, 2003.

(51) Int. Cl.[7] ................................................ H02K 9/06
(52) U.S. Cl. ......................... 310/62; 310/63; 310/263
(58) Field of Search ............................. 310/62, 63, 263

(56) References Cited

U.S. PATENT DOCUMENTS

| 3,184,625 | A | | 5/1965 | Farison | |
|---|---|---|---|---|---|
| 3,538,361 | A | | 11/1970 | Hilterbrick et al. | |
| 3,553,511 | A | | 1/1971 | Halesowen et al. | |
| 3,809,995 | A | * | 5/1974 | Hardin | 307/18 |
| 5,254,896 | A | * | 10/1993 | Bradfield et al. | 310/263 |
| 5,552,651 | A | * | 9/1996 | Radomski | 310/181 |
| 5,744,892 | A | * | 4/1998 | Mukai et al. | 310/251 |
| 5,793,143 | A | * | 8/1998 | Harris et al. | 310/263 |
| 5,825,114 | A | * | 10/1998 | Mukai | 310/251 |
| 6,369,471 | B1 | * | 4/2002 | Whitted et al. | 310/62 |
| 6,437,475 | B1 | * | 8/2002 | Buck et al. | 310/232 |
| 6,455,958 | B1 | * | 9/2002 | Asao et al. | 310/51 |

FOREIGN PATENT DOCUMENTS

| EP | 539339 A1 | * | 4/1993 | ............ F04D/29/44 |
| EP | 1388924 A2 | * | 2/2004 | ............ H02K/9/06 |
| FR | 2603142 | | 2/1988 | |
| GB | 2282490 | | 5/1995 | |
| JP | 2214440 | | 8/1990 | |

* cited by examiner

Primary Examiner—Joseph Waks
(74) Attorney, Agent, or Firm—MacMillan, Sobanski & Todd LLC

(57) ABSTRACT

A method is performed for attaching a fan to a rotor assembly for a dynamounted electric machine. A shaft is mounted within a housing of the dynamo-electric machine. The shaft includes an integral shoulder portion for creating an abutment surface. A fan which includes a fan base and a plurality of fan blades protruding from the fan base is mounted on the shaft. The fan base has a central bore wherein an inner circumference of the fan base along the central bore is juxtaposed to the abutment surface. A pair of pole cores is mounted axially along the shaft toward the shoulder portion so as to clamp the fan between a respective end of the pole cores and the abutment surface.

12 Claims, 4 Drawing Sheets

APPARATUS AND METHOD FOR RETAINING A COOLING FAN

CROSS REFERENCE TO RELATED APPLICATIONS

This application claims the benefit of U.S. Provisional Patent Application No. 60/454,279, filed Mar. 13, 2003, the disclosure which is herein incorporated by reference.

STATEMENT REGARDING FEDERALLY SPONSORED RESEARCH

Not Applicable.

BACKGROUND OF THE INVENTION

1. Field of the Invention

This invention relates to a cooling fan of a rotary electromechanical machine. More particularly, the invention is directed to retaining a cooling fan on a shaft of an alternator assembly.

2. Description of the Related Art

One type of known electromechanical machine is an alternator comprising an alternator housing, a stator, rotor shaft, two iron pole pieces, one or more cooling fans, electrodes, and a rotor coil. A vast majority of all vehicles driven today use front-end accessory drive alternators that contain Lundell type rotors. The Lundell type rotor is used to generate the magnetic field within an alternator. The magnetic field of the rotor is generated when the field coil of the rotor, made up of insulated copper wire wrapped around an electrically insulated bobbin that surrounds a steel hub, is energized and a current flows through the wire. The rotor in conjunction with stator generates electrical power for the various components utilized by the automobile. Since the alternator is driven by the engine, it has a substantial impact on fuel economy. It is therefore critical and strategic to alternator and automobile manufacturers to improve alternator efficiency for increasing the fuel economy. In order to improve the efficiency of any electrical machine it is necessary to reduce the losses within the machine. The losses can generally be categorized as either mechanical, electrical, or core. Losses in the alternator are dissipated as heat generated within the machine. It is critical to the alternator to improve the heat dissipation to allow for cooler operation and improved efficiency. One such method to increase heat dissipation is to provide one or more cooling fans within the alternator to create a cooling airflow along the rotor, the stator, and/or a rectifier.

Cooling fans are typically welded to an end (e.g. front or back face) of the rotor pole core surfaces. It is well known in the industry that a robust attachment of the fans to the pole core is becoming an increasing difficult task in light of increases in operating speeds of the rotor. Vehicle maximum engine RPM's continue to increase, and the demand for increased electrical power leads to smaller pulley sizes on alternators to facilitate rotating the rotor at higher RPM's when at engine.

Currently, internal alternator fans are generally resistance or laser welded onto the end surface of the pole core which consists of low carbon steel. This traditional method of attaching the cooling fan leads to a number of disadvantages especially if the process is performed by machine automation. Such disadvantages include expensive manufacturing equipment, expensive and labor intensive maintenance, significant downtime, and difficulties in controlling the welding quality in a production environment. Resistance welders require frequent maintenance to replace copper electrodes and realignment of fixtures. Laser welders often require lens and shield replacement along with downtime related to changing laser bulbs as part of regular maintenance. Furthermore, welding operations can produce a significant amount of scrap due to incorrect welds or as a result of in-production process validation testing of the weld strength which is usually a destructive test.

SUMMARY OF THE INVENTION

The present invention has the advantage of retaining a cooling fan about a shaft of a dynamo-electric machine without having to weld the cooling fan to an end of a pole core.

In one aspect of the invention, a method is performed for attaching a fan to a rotor assembly for a dynamo-electric machine. A shaft is provided for being mounted within a housing of the dynamo-electric machine. The shaft includes an integral shoulder portion for creating an abutment surface. A fan which includes a fan base and a plurality of fan blades protruding from the fan base is mounted on the shaft. The fan base has a central bore wherein the inner circumference of the fan base along the central bore is juxtaposed to the abutment surface. A pair of pole cores is mounted axially along the shaft toward the shoulder portion so as to clamp the fan between a respective end of the pole cores and the abutment surface.

DETAILED DESCRIPTION OF PREFERRED EMBODIMENTS

Figure 1:
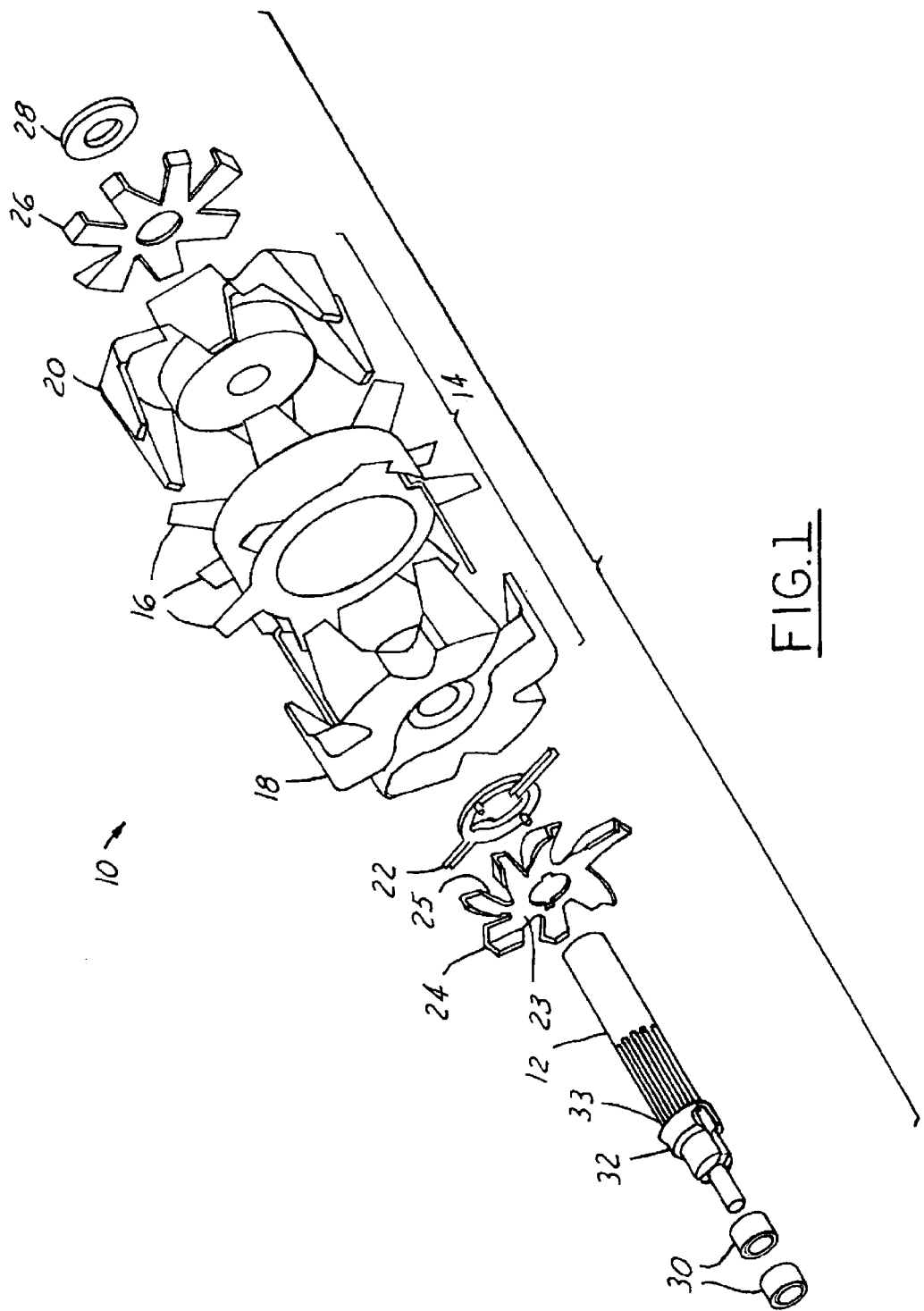
FIG. 1 is an exploded, perspective view of an alternator assembly portraying the components mounted about a shaft in a first preferred embodiment.

Referring now to the Drawings and particularly to FIG. 1, a rotor assembly 10 of an alternator assembly comprises a pole core assembly 14 secured to a shaft 12. The pole core assembly 14 includes a pair of pole claws 18, 20 encasing a rotor coil assembly 16 which is also known as a field coil which is used to generate a magnetic flux when an electric current is passed therein. A lead coil wire retainer 22 is fastened to the pole core assembly 14 for retaining a beginning coil lead wire and an end coil lead wire extending from the rotor coil assembly 16. The lead coil retainer 22 is submerged below a surface of a respective end 15 of the pole core assembly 14. A first cooling fan 24 (such as a rear cooling fan) and a second cooling fan 26 (such as a front cooling fan) are secured to each side of the pole core assembly 14 for creating a cooling airflow within the alternator assembly. A pair of slip rings 30 which are brushcontacted ring electrodes are secured to a first region of the shaft 12 for supplying electrical current to the pole core assembly 14 via the beginning coil lead wire and the end coil lead wire. A rotor stop 28 is mounted to a second region of the shaft 12 to assist in retaining the pole core assembly 14 and the first and second cooling fan 24, 26 between the shoulder portion 32 and the rotor stop 28.

The shaft 12, generally having a first diameter for receiving the pole core assembly 14, extends axially and is rotatable within the alternator assembly. The shaft includes a shoulder portion 32 integrally formed as part of the shaft 12. In the preferred embodiment the shaft 12 and shoulder portion 32 are formed by cold heading, however, screw machining and molding may also be utilized. The shoulder portion 32 has a cross section or second-diameter that is larger than the first diameter of the shaft 12. The shoulder portion 32 includes an abutment surface 33 which functions as an abutment for rotor assembly components as the components are assembled onto the shaft 12. The shaft 12 may include knurls extending axially along the shaft up to the shoulder portion 32 to assist in retaining the rotor assembly components mounted on the shaft 12. The rear cooling fan 24 includes a mounting bore with an inner diameter that is preferably larger than the first diameter of the shaft 12 but smaller than the second diameter of the shoulder portion 32. Alternatively, the inner diameter of the mounting bore may be slightly smaller than the first diameter of the shaft 12 to press-fit the cooling fan 24 onto the shaft 12. During assembly, the rear cooling fan 24 is advanced axially along the shaft until a first side surface 23 of the rear cooling fan 24 is in contact with the abutment of the shoulder portion 32. The pole core assembly 14 is then mounted axially along the shaft 12 until the respective end 15 is in contact with a second side surface 25 of the rear cooling fan 24. As the respective end 15 is brought into contact with the rear cooling fan 24, force is applied to pole core assembly 14 in the direction of the shoulder portion 32 so as to clamp the rear cooling fan 24 between the shoulder portion 32 and the pole core assembly 14. Knurls located on the shaft 12 press-fit the pole core assembly 14 onto the shaft and assist in preventing the pole core assembly 14 from backing out once the pole core assembly 14 is clamped against the rear cooling fan 24. The rotor stop 28 mounted to a second region of the shaft 12 further assists in retaining the pole core assembly 14 on the shaft 12.

Figure 2:
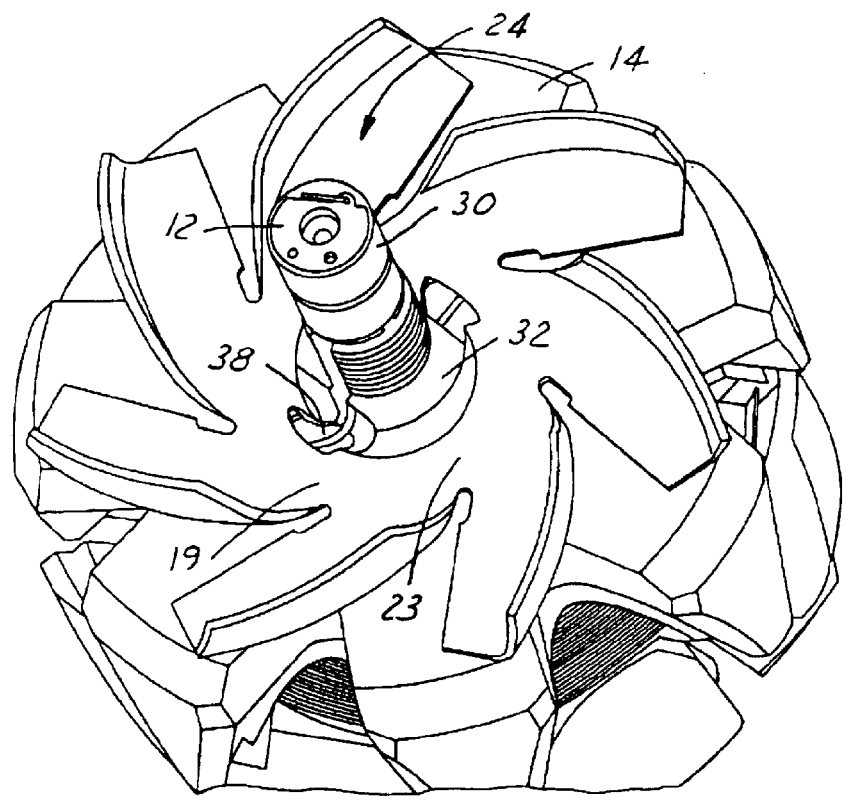
FIG. 2 is a perspective view of cooling fan clamped between a shaft and a pole core of the alternator assembly in the first preferred embodiment.

FIG. 2 illustrates the rear cooling fan 24 in a clamped position within the rotor assembly 10. The fan base 23 of the rear cooling fan 24 is clamped between the pole core assembly 14 and the shoulder portion 32 of the shaft 12 wherein the fan blades 23 are also seated against the respective end 15. Also shown are recess grooves 38 in the shoulder portion 32 for allowing the beginning coil lead wire and the end coil lead wire to pass from the rotor core assembly 14 to the slip rings 30.

Figure 3:
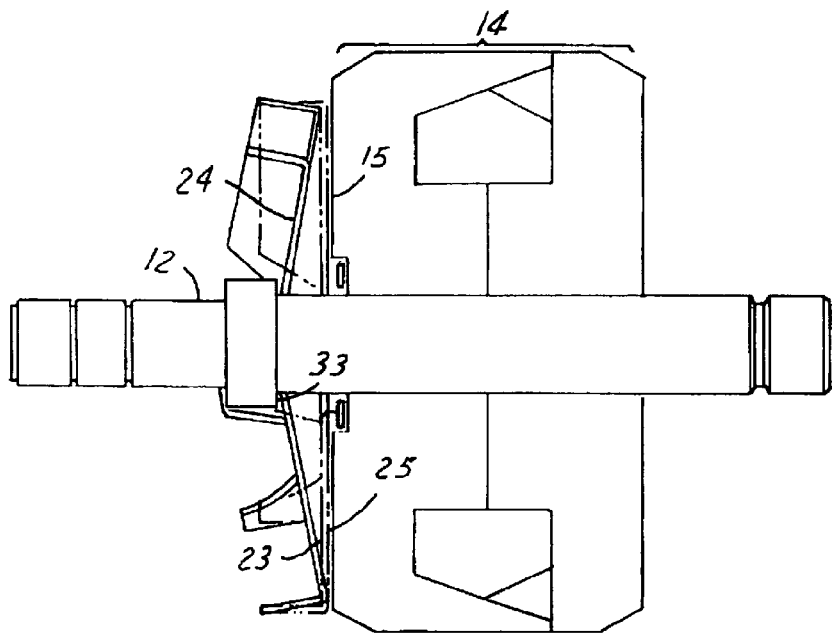
FIG. 3 is a side view of a cooling fan being assembled to a rotor assembly according to a second preferred embodiment.

FIG. 3 illustrates the rear cooling fan 24 attachment to a rotor assembly 10 according to a second preferred embodiment prior to the application of a clamping force. The rear cooling fan 24 is initially formed to have a conical shape. The conical shape elevates from said mounting bore to an outer circumference of said rear cooling fan 24. The rear cooling fan 24 is advanced axially along the shaft 12 until the first side surface 23 about the mounting bore is in contact with the shoulder portion 32. The pole core assembly 14 is then advanced axially along the shaft 12 until the respective end 15 is in contact with the outer circumference of the second side surface 25. The respective end of the pole core assembly 14 is then urged against the second side surface 25 so as to reduce the rotation of the rear cooling fan 24 with respect to the shaft 12. As the respective end 15 is urged (or force applied) against the second side surface 25, the cooling fan 24 partially flattens against the respective end 15 wherein a significant portion of the second surface 25 is placed in contact with the respective end 15. The rear cooling fan 24 is clamped between the pole core assembly 14 and the shoulder portion 32. The increased surface area in contact between the respective end 15 and the rear cooling fan 24 increases the heat transfer between the rear cooling fan 24 and the pole core assembly 14. As a result, heat dissipation in the pole core assembly is increased. Knurls extending axially along the shaft 12 prevent the pole core assembly from backing out. By virtue of the shoulder portion 32 being integral as part of the shaft 12, displacement of the shoulder portion 32 does not occur when force is applied to the so as to flatten the rear cooling fan. Reliability of components stacked along the shaft 12 will have tighter tolerances as the shoulder portion 32 will be dimensionally positioned at a desired distance along the shaft 12. Furthermore, the part count for the rotor assembly 10 is reduced and complexity for manufacturing is thereby decreased (elimination of an operation of attaching the shoulder to a shaft).

Figure 4A:
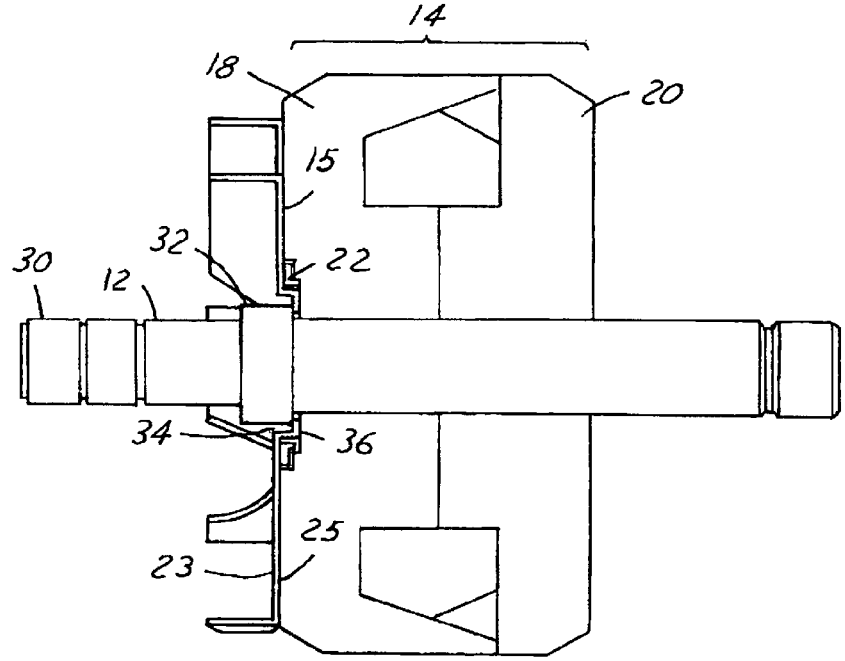
FIG. 4*a* is a side cut-away view of a rotor assembly according to a third preferred embodiment.

FIG. 4a illustrates a cut away view of the rotor assembly 10 according to the third preferred embodiment. The rear cooling fan 24 includes a drawn-down center portion 34 proximate to the mounting bore of the rear cooling fan 24. The pole core assembly 14 includes a recess 36 located about an inner aperture of the respective end 15. The recess 36 has a step-shape for receiving both the drawn-down center portion 34 and the shoulder portion 32. The rear cooling fan 24 is mounted axially along the shaft 12 so that the first side surface 23 is juxtaposed to the shoulder portion 32. As the pole core assembly 14 is mounted axially along the shaft and brought into contact with the second side surface 25, the recess 36 receives the drawn-down center portion 34 and the shoulder portion 32. The shoulder portion 32 abuts and forces the drawn-down center portion 34 into the recess 36 until the second side surface 25 is clamped against the respective end 15. In the preferred embodiment, the drawn-down center portion 34 is also in contact with a surface of the recess 36. Alternatively, the drawn-down center portion 34 may not be in contact against the surface of the recess 36 while the second side surface 25 is in clamped against the respective end 15.

The lead coil wire retainer 22 located below the surface of the respective end 15 has an inner diameter that is larger than an outer diameter of the drawn-down portion 34 which allows the drawn-down portion 34 and the shoulder portion 32 access to the recess 36. Since the addition of the shoulder portion 32 would require additional shaft length to incorporate the shoulder portion 32, the housing assembly would also need to be lengthened to accommodate the added length of the shaft 12. However, since the recess 36 allows a part of the shoulder portion 32 to be submerged below the surface of the respective end 15, the additional length needed to accommodate the shoulder portion 32 is thereby minimized and packaging space is conserved.

Figure 4B:
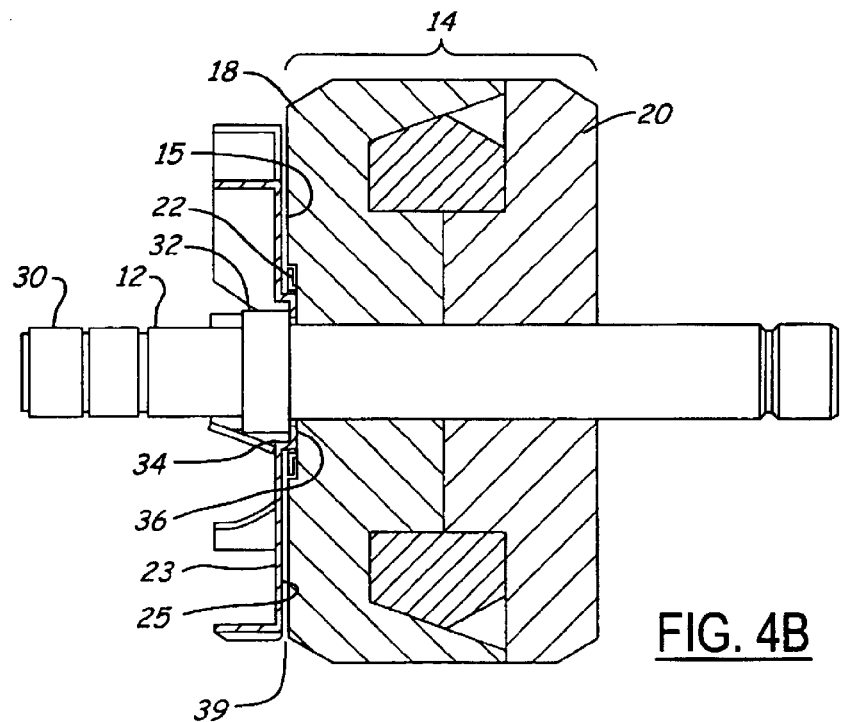
FIG. 4*b* is a side cut-away view of a rotor assembly according to a fourth preferred embodiment.

FIG. 4b illustrates a cut away view of the rotor assembly according to a fourth preferred embodiment. The drawn down-center portion 34 is received by the abutment surface 33 and is clamped against the surface of the recess 36. In this embodiment, only the drawn-down center portion 34 is in contact with the pole core assembly 14, whereas a space 39 remains between the second side surface 25 and a portion of the respective end 15.

Figure 4C:
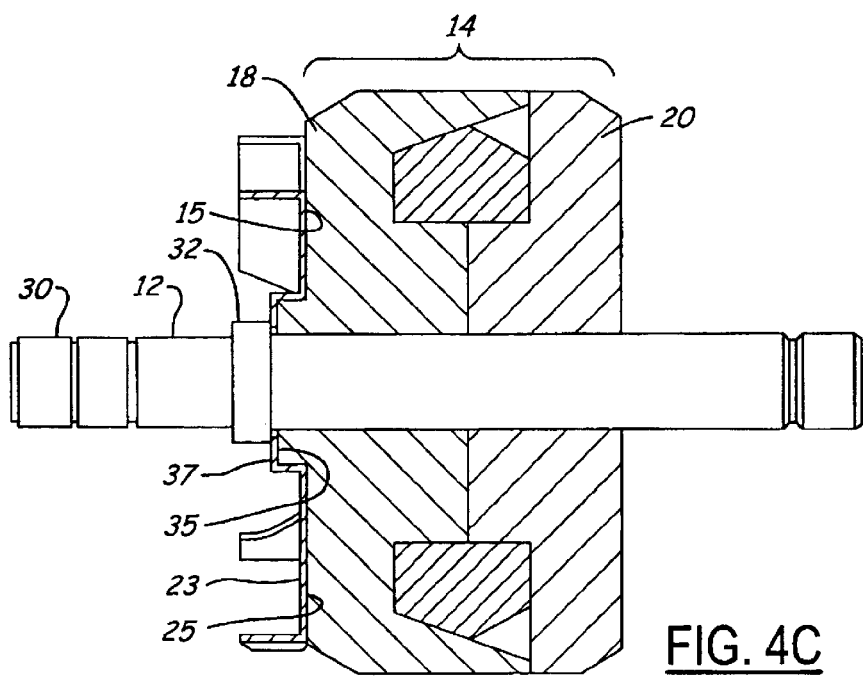
FIG. 4*c* is a side cut-away view of a rotor assembly according to a fifth preferred embodiment

FIG. 4c illustrates a cut away view of the rotor assembly according to a fifth preferred embodiment. The pole core assembly 14 includes a shoulder portion 35 on the end surface 15. The rear cooling fan 24 has a drawn-up center portion 37 proximate to the mounting bore. As the pole core assembly 14 is mounted axially along the shaft 12, the drawn-up center portion 37 is clamped between the shoulder portion 32 of the shaft 12 and the shoulder portion 35 of the pole core assembly 14. Preferably, the second side surface 25 and the respective end 15 are also in contact or clamped against one another. Alternatively, the space 39 (as shown in FIG. 4b) may be present between the second side surface 25 and the respective end 15.

Figure 5:
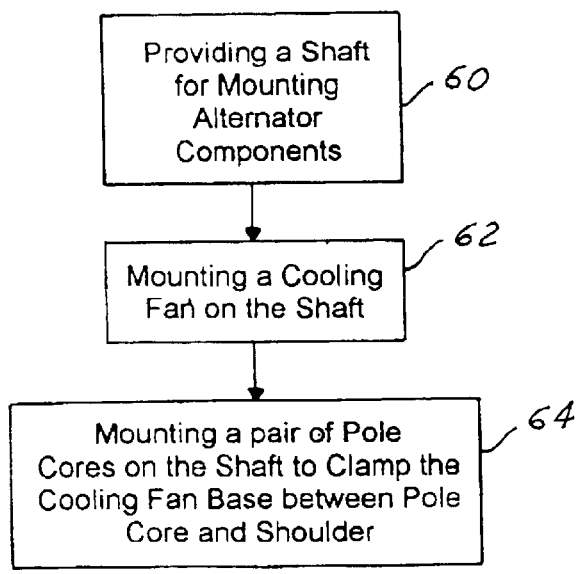
FIG. 5 is a flow diagram showing a method of attaching the cooling fan about the shaft of the alternator assembly.

FIG. 5 illustrates a method for clamping a cooling fan to a rotor assembly. In step 60, a shaft is provided for mounting components of the rotor assembly. The shaft extends axially and includes a shoulder portion integrally formed as part of the shaft at the first region. The shoulder portion functions as an abutment for the components of the rotor assembly mounted along the shaft The shaft includes knurls to retain the components of the rotor assembly so that the components rotate in unison with the shaft. In step 62, the cooling fan is mounted axially along the shaft until a fan base on a first side of the cooling fan is juxtaposed with an abutment surface of the shoulder portion. The fan base includes a mounting bore having an inner circumference wherein the inner circumference smaller than the outer diameter of the shoulder portion. In step 64, a pole core assembly is mounted axially along the shaft toward the shoulder portion to clamp the fan base between the respective end of the pole core assembly and the shoulder portion.

What is claimed is:

1. A method for attaching a fan to a rotor assembly for an alternator, said method comprising the steps of:

providing a shaft for mounting within a housing of said alternator, wherein said shaft includes an integral shoulder portion for creating an abutment surface;

mounting a fan on said shaft including a fan base and a plurality of fan blades protruding from said fan base, wherein said fan base includes a central bore, and wherein an inner circumference of said fan base along said central bore is juxtaposed to said abutment surface; and mounting a pair of pole cores axially along said shaft toward said shoulder portion to clamp said fan base between a respective end of said pole cores and said abutment surface.

2. The method of claim 1 wherein said fan is initially formed with a conical shape elevating said inner bore with respect to an outer circumference, a first side surface of said fan being in contact with said shoulder portion and a second side surface of said fan being in contact with said respective end, wherein said second side surface of said outer circumference is urged against said respective end so as to reduce rotation with respect to said shaft and to increase heat transfer between said first fan and said respective end.

3. The method of claim 1 wherein said shaft includes knurls extending to said shoulder so as to press-fit said cooling fan onto shaft.

4. The method of claim 1 wherein said fan includes a drawn down center portion on said inner circumference extending axially along said shaft toward said respective end and said respective end includes a recess on an inner circumference of said respective end.

5. A rotor assembly for a dynamo-electric machine comprising:

a shaft generally having a first diameter, said shaft extending axially and being rotatable within said machine, wherein said shaft includes an integrally formed shoulder portion creating an abutment, said shoulder portion having a cross section larger than said first diameter;

a pole core assembly having a pair of pole pieces encasing a field coil to generate a magnetic field, said pole core assembly secured to said shaft; and a fan for rotating with said shaft having a mounting bore smaller than said cross section of said shoulder portion, said fan being clamped between said shoulder portion and a respective end of said pole core assembly.

6. The rotor assembly of claim 5 wherein said fan is initially formed with a conical shape elevating said mounting bore with respect to an outer circumference of said fan, a first side surface of said fan being in contact with said shoulder portion and a second side surface of said fan being in contact with said respective end, wherein said second side surface of said outer circumference is urged against said respective end so as to reduce rotation with respect to said shaft and to increase heat transfer is between said fan and said respective end.

7. The rotor assembly of claim 5 wherein said shaft includes axial knurls extending to said shoulder portion so as to press-fit said fan onto said shaft.

8. The rotor assembly of claim 5 wherein said fan includes a drawn-down center portion proximate to said mounting bore and extending axially along said shaft toward said respective end, and wherein said respective end includes a recess in a respective pole piece to receive said drawn-down center portion.

9. The rotor assembly of claim 8 wherein said recess in said respective pole piece receives said shoulder portion.

10. The rotor assembly of claim 5 wherein said respective end includes a pole core shoulder portion on a respective pole piece, and wherein said fan includes a drawn-up center portion proximate to said mounting bore and extending axially along said shaft away from said respective end to receive said pole core shoulder portion.

11. The rotor assembly of claim 5 wherein said shaft includes at least one recess groove to allow at least one lead coil wire to pass from an electrode to said rotor assembly.

12. An alternator assembly including an alternator housing comprising:

a shaft generally having a first diameter, said shaft extending axially and being rotatable within said alternator housing, wherein said shaft includes an integrally formed shoulder portion creating an abutment, said shoulder portion having cross section larger than said first diameter;

a stator including a cylindrical laminated core positioned in said alternator housing having a winding carried by a stator core to generate an electric alternating current;

a pole core assembly having a pair of pole pieces encasing a field coil to generate a magnetic field, said pole core assembly secured to said shaft; and a fan for rotating with said shaft having a mounting bore smaller than said cross section of said shoulder portion, said fan being clamped between said shoulder portion and a respective end of said pole core assembly.

* * * * *